US012485450B2

(12) United States Patent
Hung et al.

(10) Patent No.: US 12,485,450 B2
(45) Date of Patent: Dec. 2, 2025

(54) GLUE SPREADER

(71) Applicant: Chih Liang Hung, Taipei (TW)

(72) Inventors: Chih Liang Hung, Taipei (TW); Hsin Tseng, Taipei (TW); Zoe Tseng, Taipei (TW)

(73) Assignee: Chih Liang Hung, Taipei (TW)

( * ) Notice: Subject to any disclaimer, the term of this patent is extended or adjusted under 35 U.S.C. 154(b) by 0 days.

(21) Appl. No.: 18/735,001

(22) Filed: Jun. 5, 2024

(65) Prior Publication Data

US 2025/0178024 A1 Jun. 5, 2025

(30) Foreign Application Priority Data

Dec. 5, 2023 (TW) ................................ 112213270

(51) Int. Cl.
*B05C 17/10* (2006.01)
*B05C 17/005* (2006.01)

(52) U.S. Cl.
CPC ........ *B05C 17/10* (2013.01); *B05C 17/00503* (2013.01); *B05C 17/00506* (2013.01); *B05C 17/00513* (2013.01); *B05C 17/00516* (2013.01)

(58) Field of Classification Search
CPC .............. B05C 17/10; B05C 17/00503; B05C 17/00506; B05C 17/00513; B05C 17/00516
USPC .......................................................... 401/266
See application file for complete search history.

(56) References Cited

U.S. PATENT DOCUMENTS 5,797,692 A * 8/1998 Poole ..................... B65D 35/36 401/266
9,038,866 B2 * 5/2015 Nelson .............. B05C 17/00513 222/568
9,993,837 B2 * 6/2018 Ullett .................. B05C 17/0123
11,426,757 B1 * 8/2022 Zamarripa .......... E04F 21/1655
2010/0278958 A1 * 11/2010 Chamberlain .......... E04F 21/30 425/458

FOREIGN PATENT DOCUMENTS

EP 0106387 B1 * 12/1986 ............. B65D 35/36
GB 2553866 A * 3/2018 ....... B05C 17/00516

* cited by examiner

*Primary Examiner* — Jennifer C Chiang
(74) *Attorney, Agent, or Firm* — Che-Yang Chen; Law Office of Michael Chen

(57) ABSTRACT

A glue spreader is disclosed. It is a tubular structure with a body. The body tapers from a first open end to a second open end. A cross-sectional shape of the body gradually changes from a perfect circle at the first open end to an oblate circle at the second open end. The second open end forms a flow guiding curved plate outwards, the flow guiding curved plate extends in a direction vertical to an extending direction of the body and forms two symmetrical curved surfaces, and a straight-line section is formed at the end of each curved surface. The first open end is used to connect to a bottle mouth of a glue bottle of an adhesive glue.

11 Claims, 5 Drawing Sheets

1

GLUE SPREADER

FIELD OF THE INVENTION

The present invention is device for guiding glue-like material out of a container. More particularly, it refers to a glue spreader applied to neatly spread glue-like material, such as silicone glue.

BACKGROUND OF THE INVENTION

People who often work on construction sites will encounter a problem: if glue is to be bonded to the surface of an object, how can the glue be applied neatly? Take silicone glue as an example. This is a waterproof adhesive glue that is often used in decoration to seal, bond, trim, and fill gaps between objects. Due to its good waterproof and oxidation resistance, silicone glue is mostly used in sinks, bathtubs, cabinets, etc. in kitchen and bathroom to join the contact areas with walls and floors to prevent water from penetrating through gaps. Due to the high viscosity of silicone glue and inconvenience in spreading, applicators usually use a silicone glue gun to squeeze the silicone glue in the glue bottle onto a bonding surface. Since the glue outlet of the silicone glue gun is round, applying silicone glue to corner joints is not a problem. However, when silicone glue is extruded on a flat surface, the extruded strips are easy to bend, have an unsightly shape after curing, and cannot be molded in one go. If a scraper is used to smooth the silicone glue or scrape off unnecessary parts, it will not only waste time, but may also scratch the surface of the bonded object.

From the above description, it can be seen that when dealing with glue-like materials such as silicone glue, the key to whether the glue can be neatly coated lies in the design of the extrusion device. Further analysis shows that the quality of the results is controlled by an end where the glue is extruded. In order to improve the current problem of uneven coating during extrusion of all glue-like materials, the invention of the present invention proposed a novel glue spreader. The glue spreader can be installed directly on an opening of the glue bottle. It makes the glue-like material to be extruded in a neat shape and formed in one go. It is also easy to operate.

SUMMARY OF THE INVENTION

This paragraph extracts and compiles some Features of the present invention; other features will be disclosed in the follow-up paragraphs. It is intended to cover various modifications and similar arrangements included within the spirit and scope of the appended claims.

A glue spreader is disclosed. It is a tubular structure with a body. The body tapers from a first open end to a second open end. A cross-sectional shape of the body gradually changes from a perfect circle at the first open end to an oblate circle at the second open end. The second open end forms a flow guiding curved plate outwards, the flow guiding curved plate extends in a direction vertical to an extending direction of the body and forms two symmetrical curved surfaces, and a straight-line section is formed at the end of each curved surface. The first open end is used to connect to a bottle mouth of a glue bottle of an adhesive glue. The two straight-line sections are used to contact a gluing plane. Force is applied to the glue bottle to move the glue bottle together with the body toward the first open end. The adhesive glue enters the body after being extruded from the bottle mouth, then flowing through the second open end to the flow guiding curved plate, restricted by the two curved surfaces and fixed on the gluing plane.

According to the present invention, when the two straight-line sections contact the gluing plane, an angle between the gluing plane and the extending direction of the body ranges from between 15 degrees to 75 degrees.

According to the present invention, an internal thread is formed inside the first open end for rotatingly engaging with an external thread on the outside of the bottle mouth of the glue bottle.

According to the present invention, a flange is formed outside the first open end for closely connecting to the outside of the bottle mouth of the glue bottle.

According to the present invention, the adhesive glue may be silicone glue, latex, silicone sealant, epoxy resin, all-purpose glue, AB glue, nail-free glue, structural glue or rubber. In practice, a material of the body and the flow guiding curved plate may be silicone.

According to the present invention, the adhesive glue forms a glue strip with a fixed cross-sectional shape on the gluing plane.

According to the present invention, a material of the body and the flow guiding curved plate is plastic and the body and the flow guiding curved plate are integrally formed by plastic injection.

According to the present invention, the body further forms a number of ribs for users to hold in hand to install the glue spreader. The rib can increase the locking force when the glue spreader is installed and increase the hardness of the body.

According to the present invention, an indicating mark is formed in the center of the flow guiding curved plate.

The glue spreader of the present invention can be installed directly on the bottle mouth of the glue bottle via the first open end. It makes a glue-like material to be extruded in a neat shape and easy to operate.

DETAILED DESCRIPTION OF THE PREFERRED EMBODIMENTS

The present invention will now be described more specifically with reference to the following embodiments.

Figure 1:
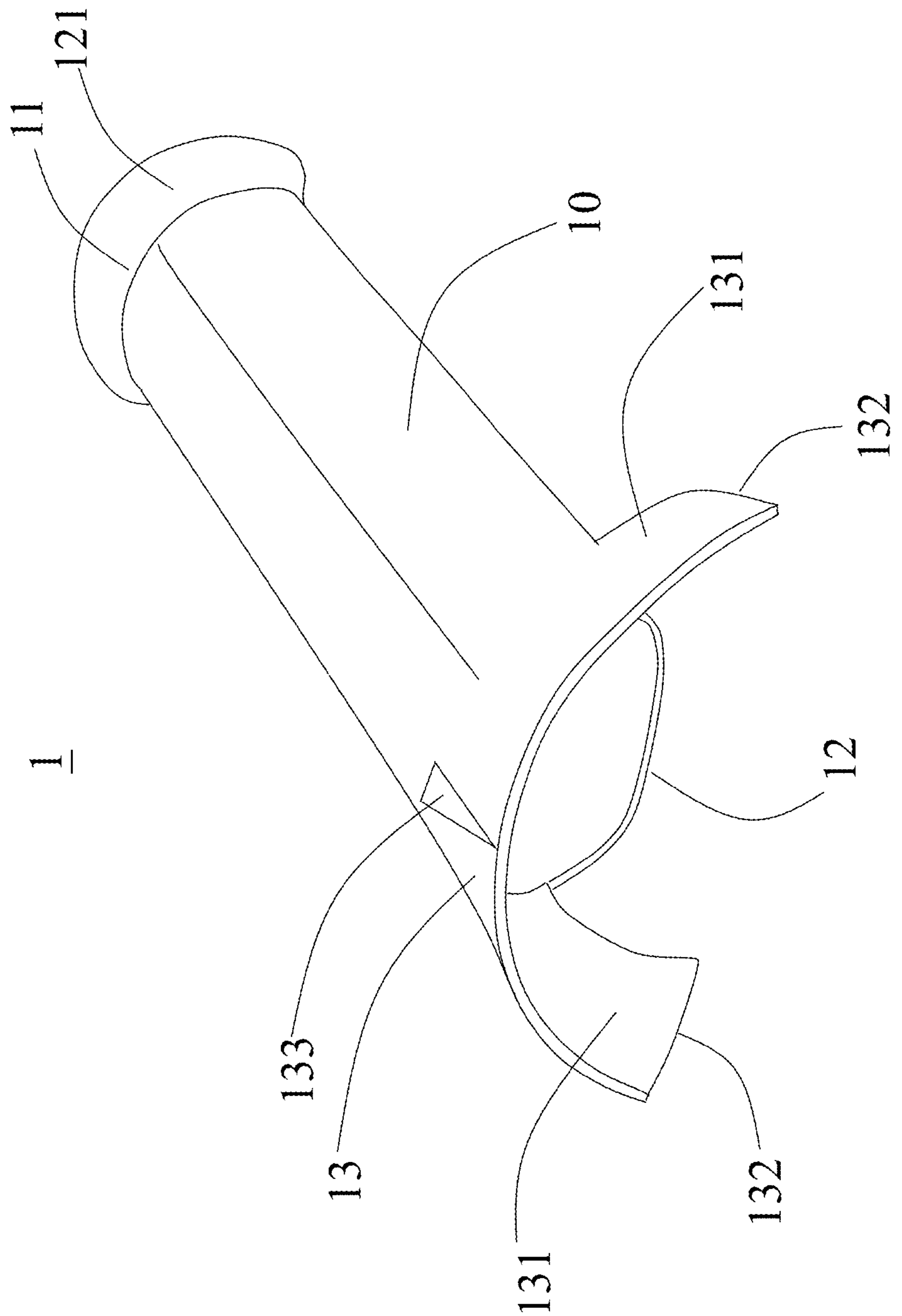
FIG. 1 is a three-dimensional view of a glue spreader according to an embodiment of the present invention.
Figure 2:
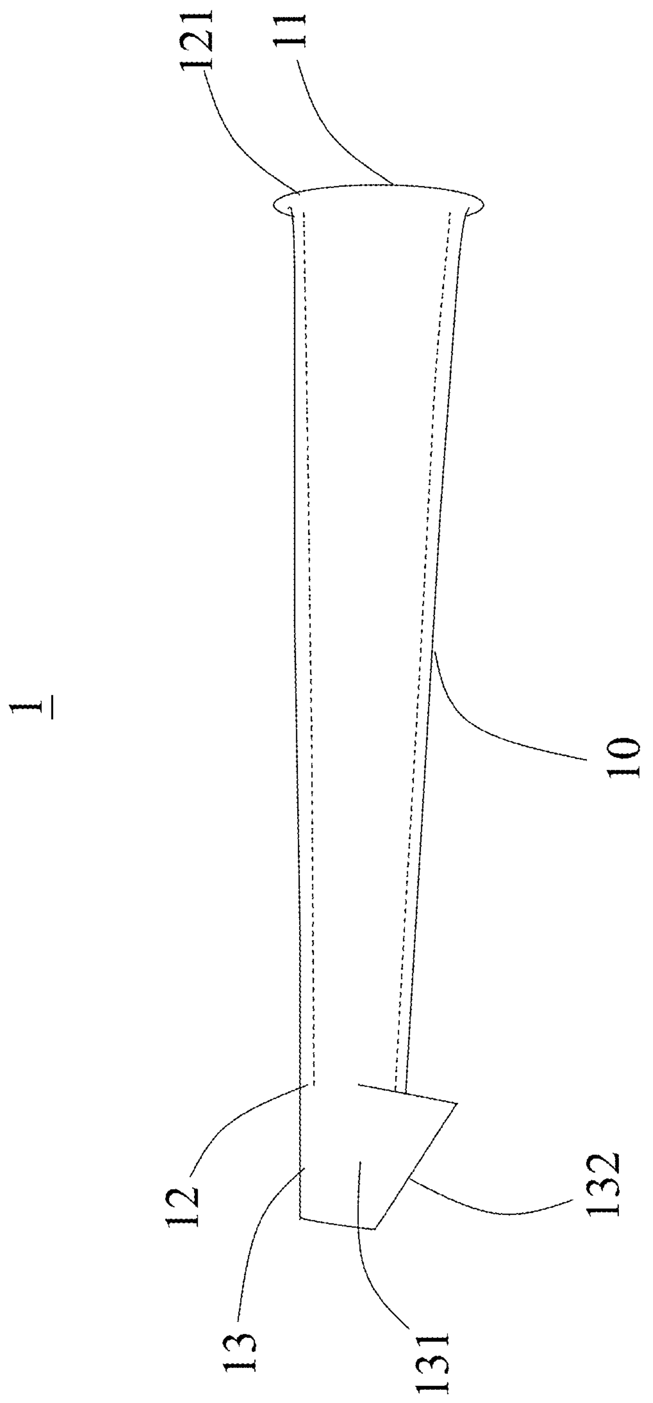
FIG. 2 is a side view of the glue spreader.

See FIG. 1 and FIG. 2. FIG. 1 is a three-dimensional view of a glue spreader 1 according to an embodiment of the present invention. FIG. 2 is a side view of the glue spreader 1. The glue spreader 1 is a device installed on a glue bottle for an adhesive glue, connected to a bottle mouth of the glue bottle, thus, to lead the flow direction of the adhesive glue after flown from the bottle mouth. According to the present invention, adhesive glue that can be applied may be, but not limited to silicone glue, latex, silicone sealant, epoxy resin, all-purpose glue, AB glue, nail-free glue, structural glue and rubber. In the embodiment, silicone glue is used as the adhesive glue for illustration.

As shown in FIG. 1 and FIG. 2, the glue spreader 1 is a tubular structure with a body 10. The body 10 tapers from a first open end 11 to a second open end 12 (change in pipe diameter is represented by the dashed lines in FIG. 2). A cross-sectional shape of the body 10 gradually changes from a perfect circle at the first open end 11 to an oblate circle at the second open end 12. This means that the caliber at first open end 11 is larger and the caliber at second open end 12 is smaller. When a certain amount of pressure is applied to the silicone glue flowing through body 10, the flow rate of the silicone glue at the second open end 12 will be faster. This helps control the amount of silicone glue extruded with less force. At the same time. The oblate second open end 12 helps the silicone glue to disperse evenly to the flow guiding curved plate 13.

The second open end 12 forms a flow guiding curved plate 13 outwards. The flow guiding curved plate 13 extends in a direction vertical to an extending direction of the body 10 and forms two symmetrical curved surfaces 131. A straight-line section 132 is formed at the end of each curved surface 131. See FIG. 3. It is a top view showing an adhesive glue G is squeezed from a glue bottle 2 after the glue spreader 1 and the glue bottle 2 are installed. Looking down from the top of glue spreader 1, the flow guiding curved plate 13 is shaped like the head of a hammerhead shark. An indicating mark 133 is formed in the center of the flow guiding curved plate 13. The indicating mark 133 may be a protruding part, a rib, a hollow part, or even a symbol drawn with ink. The indicating mark 133 is used to point out the center of glue spreader 1 (flow guiding curved plate 13). When extruding silicone glue, it can be used to aim at where the glue is applied to make the glue application more precise. The first open end 11 is used to connect to a bottle mouth of the glue bottle 2 of silicone glue G. In order to achieve a stable and tight connection with the bottle mouth of glue bottle 2, an internal thread can be formed inside the first open end 11 (not shown) for rotatingly engaging with an external thread (not shown) on the outside of the bottle mouth of the glue bottle 2. Preferably, as also shown in the figure, a flange 121 is formed outside the first open end 11 for closely connecting to the outside of the bottle mouth of the glue bottle 2. In manufacturing, a material of the body 10 and the flow guiding curved plate 13 may be plastic and the body 10 and the flow guiding curved plate 13 are integrally formed by plastic injection. In practice, a material of the body 10 and the flow guiding curved plate 13 may be silicone.

Figure 3:
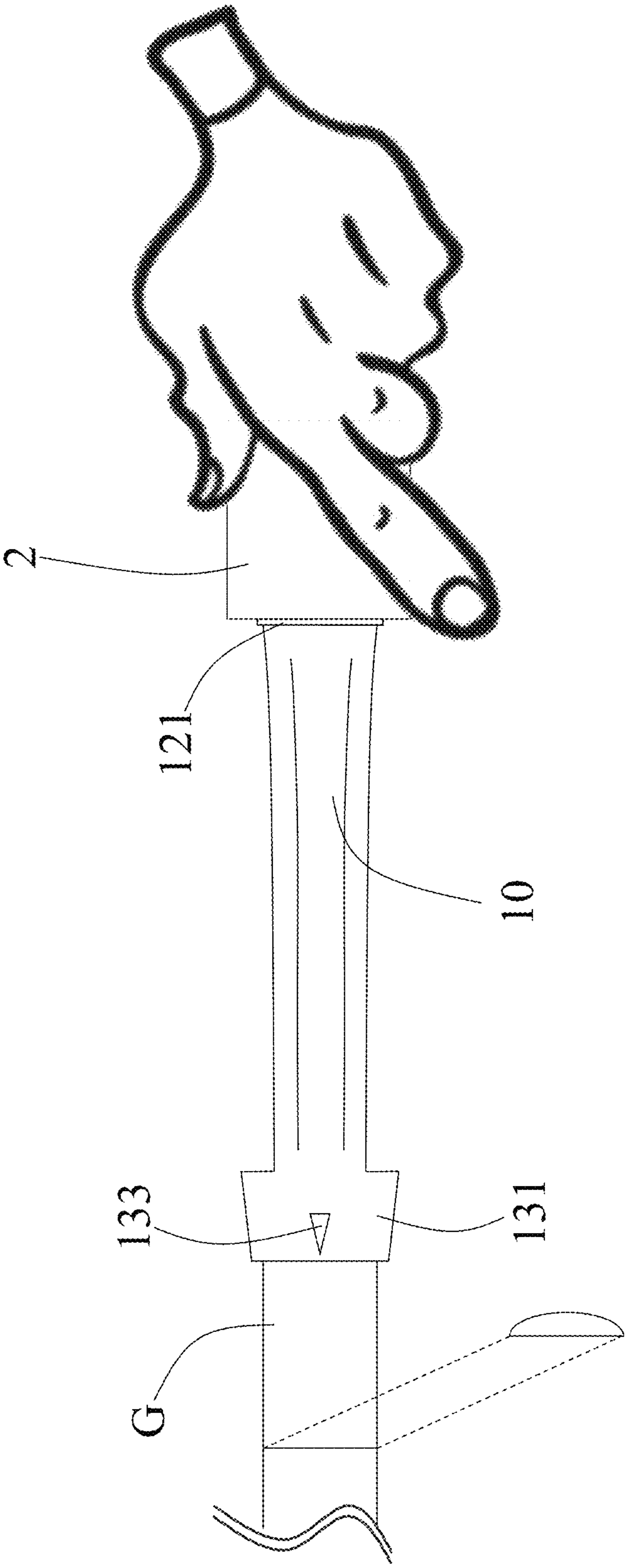
FIG. 3 is a top view showing an adhesive glue is squeezed from a glue bottle after the glue spreader and the glue bottle are installed.
Figure 4:
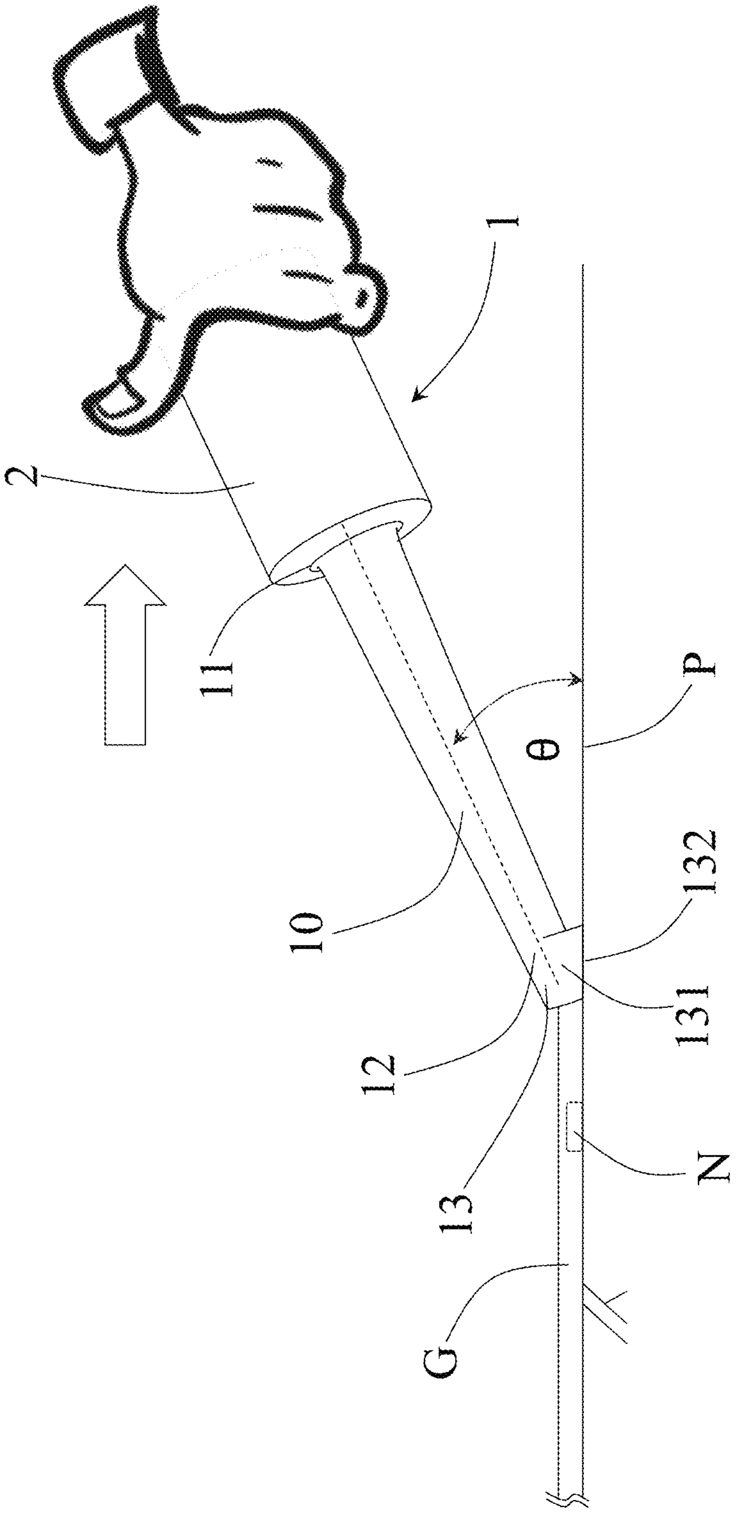
FIG. 4 is a side view showing the adhesive glue is squeezed from the glue bottle after the glue spreader and the glue bottle are installed.

See FIG. 4. It is a side view showing the adhesive glue G is squeezed from the glue bottle 2 after the glue spreader 1 and the glue bottle 2 are installed. The two straight-line sections 132 are used to contact a gluing plane P. Users exerts force applied to the glue bottle 2 to move the glue bottle 2 together with the body 10 toward the first open end 11 (namely, in FIG. 4, moving the hand in the direction of the arrow). The silicone glue G enters the body 11 after being extruded from the bottle mouth, then flowing through the second open end 12 to the flow guiding curved plate 13, restricted by the two curved surfaces 131 and fixed on the gluing plane P. As shown in FIG. 3, the cross section of silicone glue G during extrusion is cut out by the dotted lines. The silicone glue G forms a glue strip with a fixed cross-sectional shape on the gluing plane P. Its shape is close to a semi-oval and almost unchanged. As long as the movement of the glue spreader 1 and glue bottle 2 is controlled to be a straight path, the fixed glue strip will also form a straight-line segment. The design of the flow guiding curved plate 13 has an advantage: on the path where the silicone glue G forms the fixed glue strip, any small parts on the gluing plane P can be buried in the glue strip without being seen. For example, in FIG. 4, a screw nut N is buried in the glue strip of the fixed silicone glue G.

According to the present invention, when the two straight-line sections 132 contact the gluing plane P, an angle θ between the gluing plane P and the extending direction of the body (indicated by a dashed line in FIG. 4) ranges from between 15 degrees to 75 degrees. Controlling the angle θ can not only adjust the posture of the hand during application, but also adjust the cross-sectional shape of the glue strips of the silicone glue G and usage amount of the silicone glue G.

Figure 5:
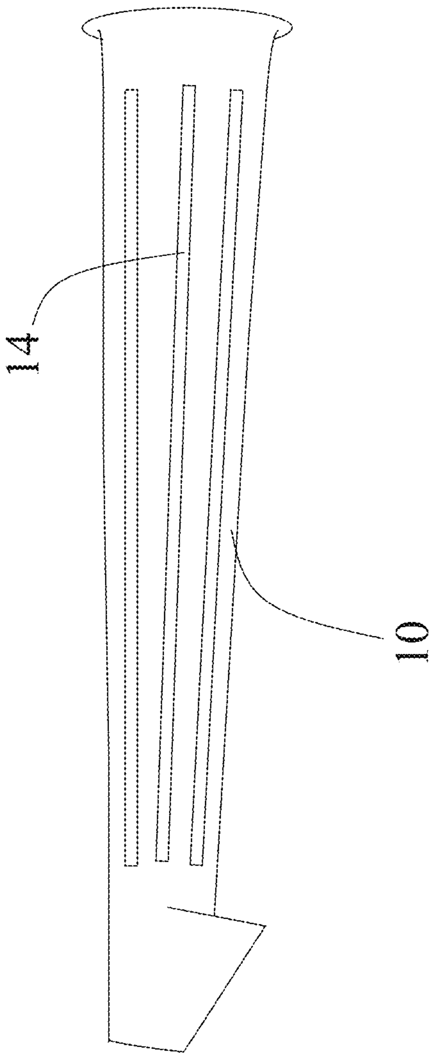
FIG. 5 is a three-dimensional view of a glue spreader according to another embodiment of the present invention.

See FIG. 5. It is a three-dimensional view of a glue spreader 1' according to another embodiment of the present invention. The difference between the glue spreader 1' of this embodiment and the glue spreader 1 in the previous embodiment is that the body 10 further forms a number of ribs 14. The function of the ribs 14 is for users to hold in hand to install the glue spreader 1, for example, installed on glue bottle 2.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A glue spreader, being a tubular structure with a body, characterized in that: the body tapers from a first open end to a second open end; the second open end forms a flow guiding curved plate outwards, the flow guiding curved plate extends in a direction vertical to an extending direction of the body and forms two symmetrical curved surfaces, two gaps are formed between the second opening end and the flow guiding curved plate, and a straight-line section is formed at the end of each curved surface; the first open end is used to connect to a bottle mouth of a glue bottle of an adhesive glue; and the two straight-line sections are used to contact a gluing plane, force is applied to the glue bottle to move the glue bottle together with the body toward the first open end, and the adhesive glue enters the body after being extruded from the bottle mouth, then flowing through the second open end to the flow guiding curved plate, restricted by the two curved surfaces and fixed on the gluing plane.

2. The glue spreader according to claim 1, wherein when the two straight-line sections contact the gluing plane, an angle between the gluing plane and the extending direction of the body ranges from between 15 degrees to 75 degrees.

3. The glue spreader according to claim 1, wherein an internal thread is formed inside the first open end for rotatingly engaging with an external thread on the outside of the bottle mouth of the glue bottle.

4. The glue spreader according to claim 1, wherein a flange is formed outside the first open end for closely connecting to the outside of the bottle mouth of the glue bottle.

5. The glue spreader according to claim 1, wherein the adhesive glue is silicone glue, latex, silicone sealant, epoxy resin, all-purpose glue, AB glue, nail-free glue, structural glue or rubber.

6. The glue spreader according to claim 1, wherein the adhesive glue forms a glue strip with a fixed cross-sectional shape on the gluing plane.

7. The glue spreader according to claim 1, wherein a material of the body and the flow guiding curved plate is plastic and the body and the flow guiding curved plate are integrally formed by plastic injection.

8. The glue spreader according to claim 1, wherein a material of the body and the flow guiding curved plate is silicone.

9. The glue spreader according to claim 1, wherein the body further forms a plurality of ribs for users to hold in hand to install the glue spreader.

10. The glue spreader according to claim 1, wherein a cross-sectional shape of the body gradually changes from a perfect circle at the first open end to an oblate circle at the second open end.

11. The glue spreader according to claim 1, wherein an indicating mark is formed in the center of the flow guiding curved plate.

* * * * *